US008621085B2

(12) United States Patent
Trost et al.

(10) Patent No.: US 8,621,085 B2
(45) Date of Patent: Dec. 31, 2013

(54) METHODS, SYSTEMS, AND COMPUTER PROGRAM PRODUCTS FOR MANAGING AND UTILIZING CONNECTIONS BETWEEN AN APPLICATION SERVER AND AN ENTERPRISE INFORMATION SYSTEM BASED ON A DAYTONA ARCHITECTURE

(75) Inventors: William R. Trost, Mequon, WI (US); Craig Jeremy Harvey, Apex, NC (US); Mark P. Regas, Fox River Grove, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1043 days.

(21) Appl. No.: 12/644,769

(22) Filed: Dec. 22, 2009

(65) Prior Publication Data

US 2011/0150218 A1    Jun. 23, 2011

(51) Int. Cl.
*G06F 15/16* (2006.01)

(52) U.S. Cl.
USPC ............ 709/227; 707/769; 707/792; 707/796

(58) Field of Classification Search
USPC ........................... 709/227; 707/769, 792, 796
See application file for complete search history.

(56) References Cited

U.S. PATENT DOCUMENTS

| 7,136,587 | B1 * | 11/2006 | Davis et al. ..................... 398/53 |
| 7,490,331 | B2 * | 2/2009 | Beisiegel et al. ............. 719/313 |
| 7,496,705 | B2 * | 2/2009 | Gish et al. ..................... 710/240 |
| 7,917,495 | B1 * | 3/2011 | Chapman et al. ............. 707/713 |
| 2003/0093403 | A1 * | 5/2003 | Upton ............................... 707/1 |
| 2003/0093471 | A1 * | 5/2003 | Upton ........................... 709/203 |
| 2008/0216172 | A1 * | 9/2008 | Forman et al. .................. 726/21 |

OTHER PUBLICATIONS

Marchioni, Francesco, JBoss AS 5 Development, Dec. 16, 2009, Packt Publishing, pp. 59, 60.*
Greer, Rick, Daytona and the Fourth Generation Language Cymbal, Jun. 1999, AT&T Laboratories Research, vol. 28, pp. 1, 2.*
Greer, Rick, Daytona and the Fourth Generation Language Cymbal, Jun. 1999, AT&T Laboratories Research, vol. 28, pp. 1-2.*
The J2EE™ Tutorial—Distributed Multitiered Applications [online], Apr. 24, 2002 [retrieved on Dec. 7, 2009]. Retrieved from the Internet: <URL: http://java.sun.com/j2ee/tutorial/1_3-fcs/doc/Overview2.html#64857>.

(Continued)

*Primary Examiner* — Patrice Winder
*Assistant Examiner* — Eyob Hagos
(74) *Attorney, Agent, or Firm* — Myers Bigel Sibley & Sajovec, PA

(57) ABSTRACT

Methods for managing, and utilizing connections between an application server and an enterprise information system (EIS) based on a Daytona architecture are provided. The methods may include operating a resource adapter conforming to the JCA standard, and interfacing with and being managed by the application server. The resource adapter may be configured to provide a connection to the EIS and to submit a query request to and receive query results from the EIS, including receiving the query request from a client; instructing the EIS to open a query, compile the query, execute the query, and return the results of the execution of the query; receiving the results of the execution of the query from the EIS; instructing the EIS to terminate the connection; and returning the results of the execution of the query to the client. Related systems and computer program products are also provided.

17 Claims, 5 Drawing Sheets

(56) References Cited

OTHER PUBLICATIONS

AT&T Research—Daytona [online], Aug. 4, 2008 [retrieved on Sep. 24, 2009]. Retrieved from the Internet: <URL: http://www2.research.att.com/~daytona/index.php>.

AT&T Research—Daytona in Use [online], Mar. 4, 2008 [retrieved on Sep. 24, 2009]. Retrieved from the Internet: <URL: http://www2.research.att.com/~daytona/inuse.php>.

Spring Framework—Chapter 21: JCA CCI [online], Jan. 7, 2008 [retrieved on Dec. 16, 2009]. Retrieved from the Internet: <URL: http://static.springsource.org/spring/docs/2.0.8/reference/cci.html>.

Greer, Rick. Daytona and the Fourth-Generation Language Cymbal, ACM SIGMOD Record, vol. 28, Issue 2, Jun. 1999 [retrieved on Dec. 3, 2009]. Retrieved from the Internet: <URL: eprints.kfupm.edu.sa/33519/1/33519.pdf>.

J2EE™ Connector Architecture Specification—Version 1.5 [online], Nov. 2003 [retrieved on Dec. 3, 2009]. Retrieved from the Internet: <URL: http://java.sun.com/j2ee/connector/download.html>.

* cited by examiner

METHODS, SYSTEMS, AND COMPUTER PROGRAM PRODUCTS FOR MANAGING AND UTILIZING CONNECTIONS BETWEEN AN APPLICATION SERVER AND AN ENTERPRISE INFORMATION SYSTEM BASED ON A DAYTONA ARCHITECTURE

BACKGROUND

This disclosure relates to database access and, more particularly, to methods for managing and utilizing database connections, and systems and/or computer program products that implement such methods.

The Java Platform, Enterprise Edition (JEE) is a software development architecture created to facilitate the development and deployment of multitier enterprise applications, and to improve the portability and scalability of such applications. The JEE standard accomplishes this in part by providing a unified, component-based application model that allows the integration of a wide range of enterprise applications, including database management systems and naming and directory services. The JEE platform provides transaction management, life-cycle management, and resource pooling capabilities to components and applications; supports the Java Database Connectivity (JDBC) application programming interface (API) for database access; and provides the Java EE Connector standard discussed in more detail below.

Generally, a multitier enterprise application developed according to the JEE application model comprises three parts: containers, components, and connectors. Containers provide transaction support and resource pooling to connectors and clients, and may comprise, for instance, application servers developed in conformance with the JEE standard. Components are self-contained functional software units, each representing a portion of application logic divided by function. Connectors implement an API that enables bidirectional communication between JEE components and enterprise systems.

The Java EE Connector architecture (JCA) is a standard defined to address the challenges of providing a standard architecture for integrating JEE applications with enterprise information systems (EISs), which may be developed by different vendors or comprise legacy systems developed within an organization. The JCA standard defines a set of system-level contracts between a application server and a connector, and provides scalable, secure, and transactional mechanisms for enabling any JEE-compliant application server to communicate with any EIS for which a JCA-compliant connector has been developed. As used herein, a "resource adapter" is a JEE connector that implements the JCA standard for a particular EIS.

The Daytona database management system (DBMS) is an EIS developed by AT&T Labs originally for use within AT&T, and now available commercially. Like many other commercially available DBMSs, the Daytona architecture supports data access via unmanaged database connections using the JDBC API. Daytona, however, is distinct from other commercial DBMSs in a number of ways. First, the Daytona architecture relies on services provided by the underlying Unix operating system (such as locking file system, access control, scheduling, caching, and low-level networking), rather than duplicating those services within the DBMS itself. Consequently, databases implemented using Daytona are massively scalable, and are capable of storing and accessing extremely high volumes of data with a high degree of reliability. Additionally, the Daytona architecture provides a high-level fourth-generation query language known as Cymbal, which includes a subset of the Structured Query Language (SQL) data manipulation language. While Cymbal is a powerful language permitting a high degree of flexibility, its complexity requires a relatively high level of expertise to use effectively.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments can provide methods, devices, systems, and computer program products for managing and utilizing database connections. Pursuant to these embodiments, a method for managing and utilizing connections between an application server and an EIS may be provided. An application server supporting the JEE architecture in whole or in part is operated using a first programmed computer processor circuit, and an EIS comprising a database management system based on a Daytona architecture is operated using a second programmed computer processor circuit. A resource adapter conforming to the JCA standard and being interfaced with and managed by the application server is operated, and is configured to provide a connection to the EIS and to submit a query request to and receive query results from the EIS. Submitting a query request to the EIS may comprise receiving the query request from a client; instructing the EIS to open a query; instructing the EIS to compile the query; and instructing the EIS to execute the query. Receiving query results from the EIS may comprise instructing the EIS to return the results of the execution of the query; receiving the results of the execution of the query from the EIS; instructing the EIS to terminate the connection; and returning the results of the execution of the query to the client.

In some embodiments, the method further includes the resource adapter being further configured to submit a query request to and receive results from the EIS using multiple processing threads.

In further embodiments, the method additionally includes instructing the EIS to open a query, which comprises issuing a DS_OPEN command, including login credentials and a specification of the type of the query, to a PolyClient Daytona Query (PDQ) server of the EIS; and instructing the EIS to compile the query, which comprises issuing a DS_COMPILE command, including a name for the query and the query itself, to the PDQ server. The method further includes instructing the EIS to execute the query, which comprises issuing a DS_EXECUTE command, including the name for the query, to the PDQ server; and instructing the EIS to return the results of the query, which comprises issuing a DS_CAT command, including the name for the query, to the PDQ server. The method also includes instructing the EIS to terminate the connection, which comprises issuing a DS_CLOSE command to the PDQ server.

In additional embodiments, the method further includes a query request comprising a request for execution of a precompiled query in the EIS, wherein submitting a query request to the EIS comprises receiving the query request from a client; instructing the EIS to open a query; and instructing the EIS to execute the query. In other embodiments, the method additionally includes the resource adapter being further configured to maintain a list of precompiled queries available for execution by the client.

In some embodiments, the method also includes the resource adapter being further configured to catch exceptions resulting from opening, compiling, execution, receiving the results of, and/or terminating the connection; and to dispatch an error notification in response to an exception caught by the resource adapter.

In further embodiments, the method includes the resource adapter being further configured to submit one or more query requests to the EIS within a transaction. In additional embodiments, the method further includes one or more query requests to insert data, wherein submitting a query request to the EIS comprises receiving a list of name-value pairs and a corresponding record class from the client, and converting the list of name-value pairs into a query suitable for submission to the EIS.

In other embodiments, the method additionally includes receiving a formatter object from the client, where the formatter object specifies the format in which the results of the execution of the query are to be returned to the client. The results of the execution of the query are formatted according to the format specified by the formatter object prior to returning the results of the execution of the query to the client.

In further embodiments, the connection to the EIS provided by the resource adapter comprises a secure connection, and data communicated over the secure connection is encrypted using a cryptographic algorithm.

Embodiments have been described herein primarily with respect to methods for managing and utilizing connections between an application server supporting the JEE architecture in whole or in part and an EIS comprising a database management system based on a Daytona architecture using a resource adapter conforming to the JCA standard. However, analogous computer systems and computer program products may also be provided according to other embodiments.

Other methods, systems, and/or computer program products according to other embodiments will be or become apparent to one with skill in the art upon review of the following drawings and detailed description. It is intended that all such additional systems, methods, and/or computer program products be included within this description and be protected by the accompanying, claims.

DETAILED DESCRIPTION OF EMBODIMENTS

Figure 1:
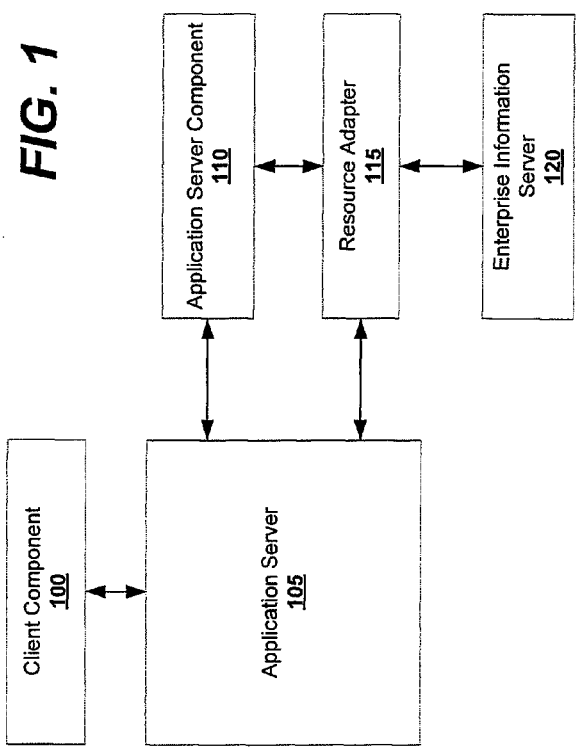
FIG. 1 is a block diagram illustrating a simplified system conforming to the JCA standard.

Methods for managing and utilizing, database connections between an application server supporting the Java Platform, Enterprise Edition (JEE) architecture in whole or in part and an EIS comprising a database management system based on a Daytona architecture, as well as related systems and computer program products, will now be described more fully hereinafter with reference to the accompanying drawings, in which illustrative embodiments are shown. However, it will be appreciated that these methods for managing and utilizing database connections between an application server supporting the JEE architecture in whole or in part and an EIS comprising a database management system based on a Daytona architecture, as well as related systems and computer program products, may be embodied in many different forms, and thus the present application should not be construed as limited to the embodiments set forth herein. Rather, these embodiments are provided so that this disclosure will be thorough and complete, and to fully convey the scope of the embodiments to those skilled in the art. Like numbers refer to like elements throughout.

The terminology used herein is for the purpose of describing particular embodiments only and is not intended to be limiting of the embodiment. As used herein, the singular forms "a", "an," and "the" are intended to include the plural forms as well, unless the context clearly indicates otherwise. It will be understood that the term "and/or" as used herein means any one of or any combination of the listed alternatives. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being, "directly coupled", "directly connected," or "directly responsive" to another element, there are no intervening elements present.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which this embodiment belongs. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

As will further be appreciated by one of skill in the art, the present embodiments may be methods, systems, and/or computer program products. Accordingly, embodiments may be entirely hardware, entirely software, or a combination of software and hardware aspects. Furthermore, embodiments may take the form of a computer program product comprising a computer-readable storage medium having computer-usable program code embodied in the medium. A non-exhaustive list of specific examples of the computer-readable storage medium would include the following: a portable computer diskette, a random access memory (RAM), a read-only memory (ROM), an erasable programmable read-only memory (EPROM or Flash memory), and a portable compact disc read-only memory (CD-ROM) or digital versatile disc (DVD). Any suitable computer-readable storage medium may be utilized including hard disks, CD-ROMs, optical storage devices, or magnetic storage devices.

Embodiments are also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller, or other processor, such that the instructions which execute on the processor(s) create means for implementing the functions specified in the block or blocks. As used herein, the term "processor circuit" includes circuits comprised of a single processor or multiple processors, wherein the processor(s) may each comprise one or more processor cores. The computer program instructions may be executed by the processor circuit(s) to cause a series of operational steps to be performed by the processor circuit(s) to produce a computer implemented process such that the instructions which execute on the processor circuit(s) provide steps for implementing the functions specified in the block or blocks.

Accordingly, the blocks support combinations of means for performing the specified functions, combinations of steps for performing the specified functions, and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations in embodiments may be written in a programming language such as Java, C++, C, JavaScript, Visual Basic. Perl, or in various other programming languages. Software embodiments do not depend on implementation with a particular programming language. The code, or portions thereof, may execute entirely on one or more servers, or it may execute partly on a server and partly on a client within a client device in a communications network. In the latter scenario, the client device may be connected to a server over a LAN or a WAN (e.g., an intranet), or the connection may be made through the internet (e.g., via an Internet Service Provider (ISP)). It is understood that the present embodiments are not TCP/IP-specific or internet-specific. Exemplary embodiments may be implemented using various protocols over various types of computer networks.

As will be appreciated by one of skill in the art, embodiments may include an application server and/or an EIS executing on a single computer, or executing on a high-availability cluster comprising two or more computers. As discussed herein, the term "application server" may refer to a system including a software framework for facilitating the development of distributed applications through the use of modular components. The term "Daytona architecture" refers to AT&T's proprietary Daytona database management system, and the term "Daytona database" may refer to any database application or service based on or implemented via AT&T's proprietary Daytona database management system. It will be understood that the term "client," as used herein, may refer to any entity (e.g., an application, component, or object, whether local or remote) that acts as a consumer of services provided by a resource adapter or application server.

Methods, systems, and computer program products are disclosed herein that may be used to manage and utilize database connections between an application server supporting the JEE architecture in whole or in part and an EIS comprising a database management system based on a Daytona architecture. As such, these methods, systems, and computer program products may be used to integrate a Daytona-based EIS with enterprise applications provided by an application server by providing managed connections between clients and the EIS.

FIG. 1 is a block diagram illustrating a simplified system conforming to the JCA standard. Client component 100 may be a JEE component executing, for instance, on a client computer, and communicatively coupled to application server 105. Client component 100 may encapsulate the logic necessary to carry out client-side operations such as data presentation, and, as such, may comprise the client tier of the system depicted in FIG. 1. Application server 105 may be a system including a software framework supporting the JEE standard in whole or in part (i.e. application server 105 may fully support the JEE standard, or may only support JCA), and providing various services, such as transaction management, life-cycle management, and resource pooling capabilities, to other components and applications. Business logic for a particular application may be encapsulated by application server component 110, which may be communicatively linked to application server 105. Application server component 110 may be embodied by, for example, Java Servlet components, Java Server Pages components, or Enterprise JavaBeans components. Resource adapter 115 may be a JCA-compliant connector interfaced with and managed by application server 100, and providing bidirectional communication between, e.g., application server 100 and/or application server component 110 on one side, and EIS 120 on the other. Application server 105, application server component 110, and resource adapter 115 collectively may comprise the server tier of the system shown in FIG. 1. EIS 120 may be an enterprise information system comprising a database management system based on a Daytona architecture, and may comprise the "back-end" EIS tier of the system depicted in FIG. 1.

Figure 2:
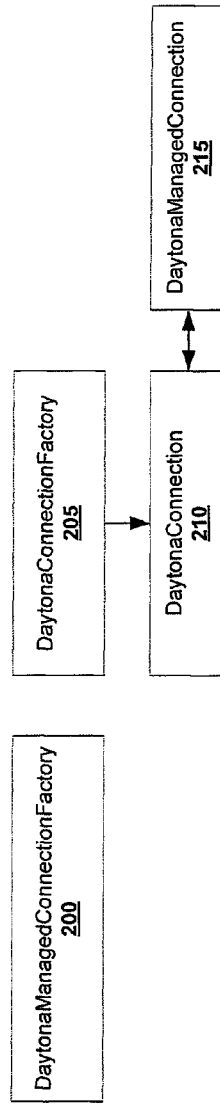
FIG. 2 is a block diagram illustrating, a high-level class diagram in accordance with some embodiments.

FIG. 2 is a block diagram illustrating a high-level class diagram of the objects comprising resource adapter 115 in accordance with some embodiments. DaytonaManagedConnectionFactory object 200 may be called by application server 105 to create DaytonaConnectionFactory object 205, which is placed on application server 105's Java Naming and Directory Interface (JNDI) service using an alias assigned within a configuration file. The alias is subsequently utilized by client component 100 to retrieve DaytonaConnectionFactory object 205 when a connection handle to Daytona-based EIS 120 is required by client component 100. When requested by client component 100, DaytonaConnectionFactory object 205 provides DaytonaConnection object 210, which handles all interaction between client component 100 and EIS 120. DaytonaConnection 210 forwards all query requests from client component 100 to DaytonaManagedConnection object 215, which holds the actual connection to Daytona-based EIS 120, and which handles all tasks related to compiling, executing, retrieving, and parsing query results. DaytonaManagedConnection object 215 is managed by the application server 105, which has responsibility for, among, other things, connection pooling (e.g., determining if and when a database connection should be created or terminated). It will be understood by one of skill in the art that a database connection to EIS 120 managed by application server 105 may comprise a secure connection, wherein data communicated over the secure connection may be encrypted using a cryptographic algorithm such as that provided by the Secure Shell (SSH) protocol.

Figure 3:
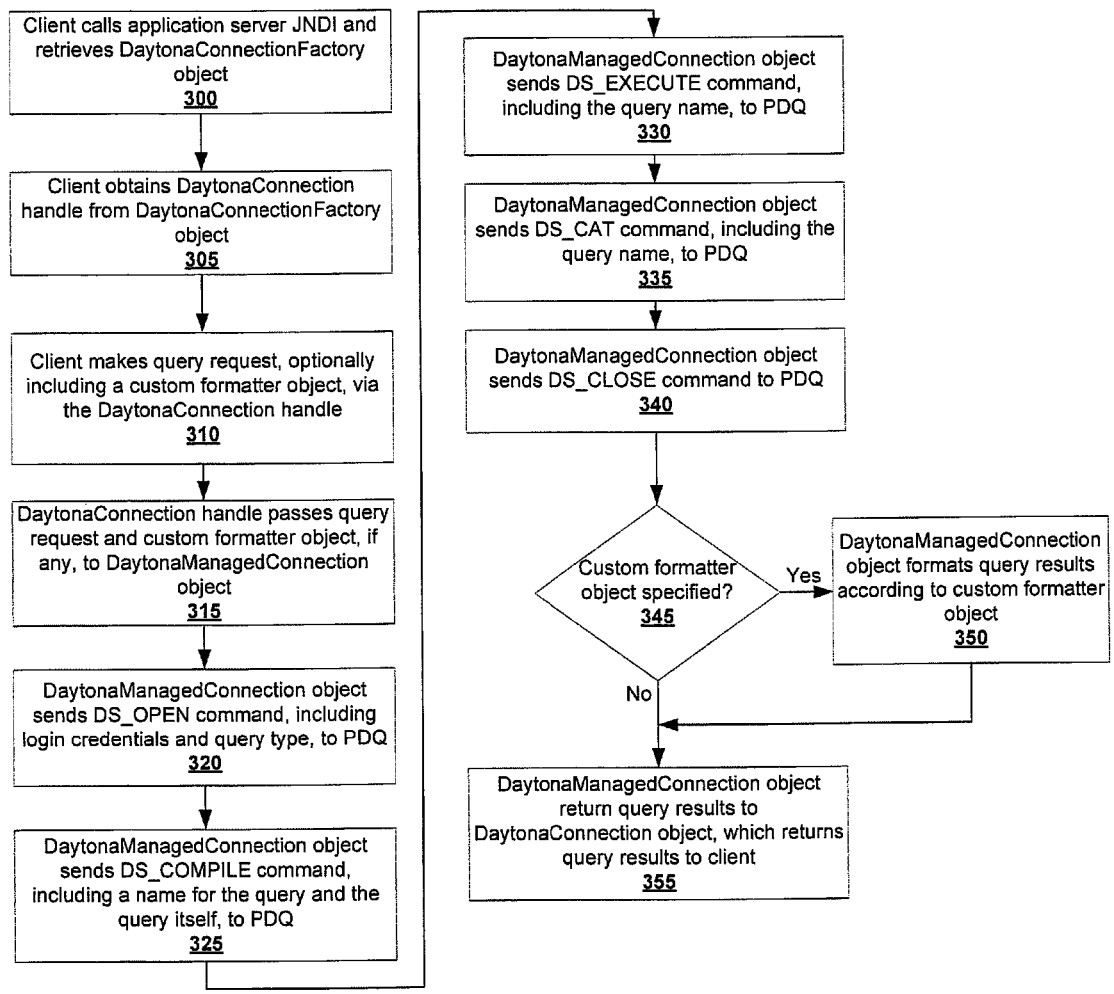
FIG. 3 is a flowchart illustrating at a high level the logical flow of utilizing a resource adapter to execute a query to retrieve data from an EIS database based on a Daytona architecture in accordance with some embodiments.
Figure 4:
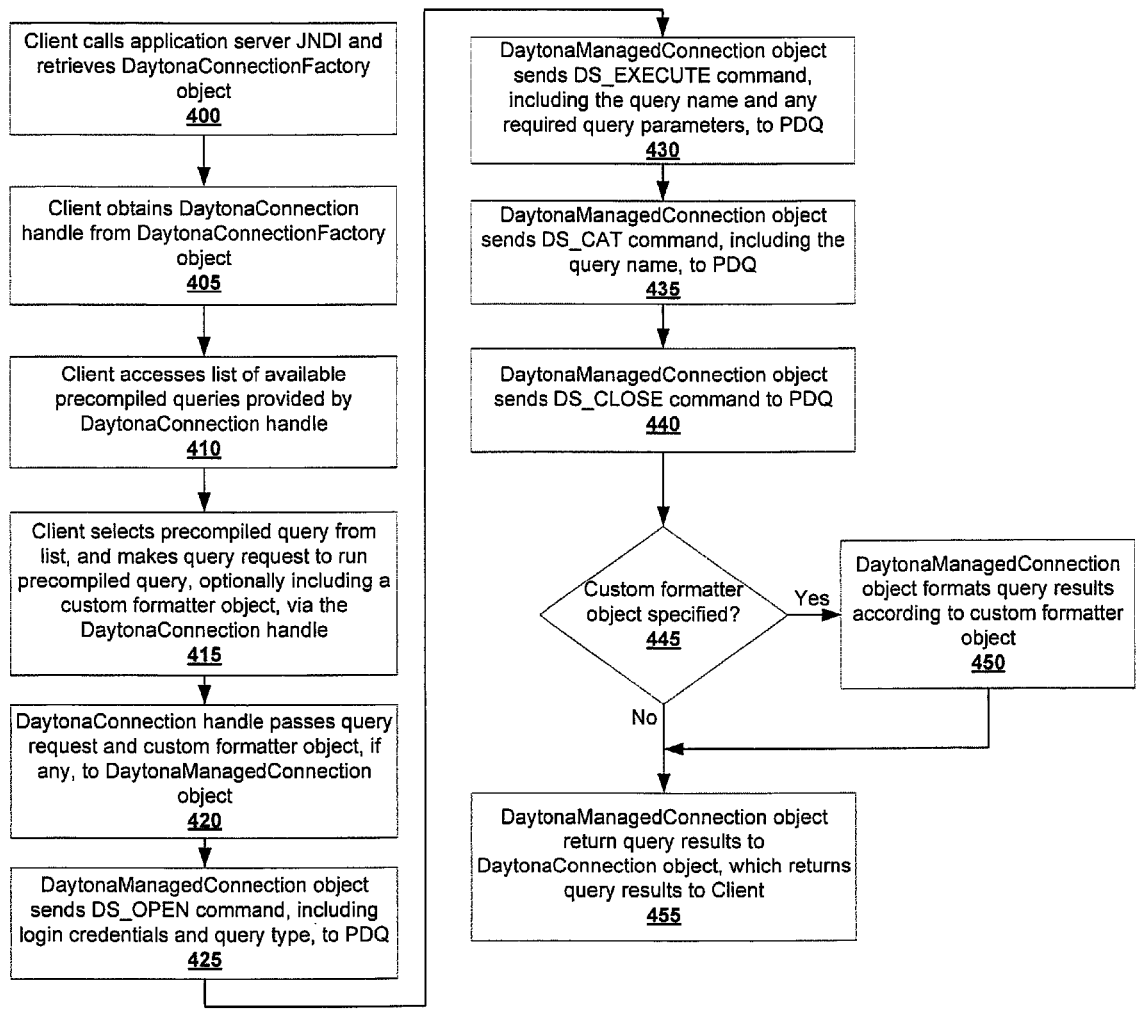
FIG. 4 is a flowchart illustrating at a high level the logical flow of utilizing, a resource adapter to execute a precompiled query to retrieve data from an EIS database based on a Daytona architecture in accordance with some embodiments.
Figure 5:
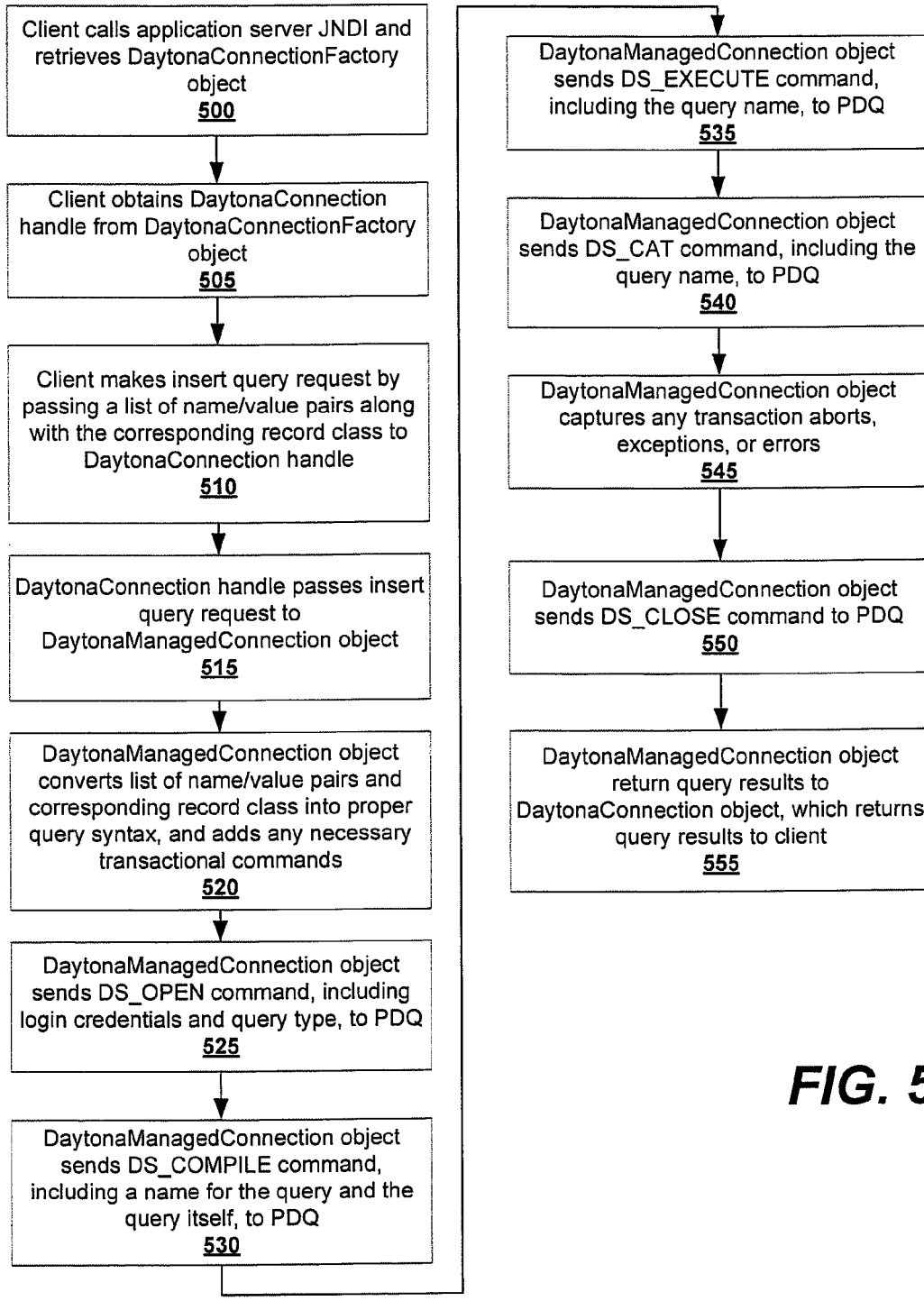
FIG. 5 is a flowchart illustrating at a high level the logical flow of utilizing a resource adapter to execute an insert query on an EIS database based on a Daytona architecture in accordance with some embodiments.

FIGS. 3-5 are flowcharts illustrating, at a high level the logical flow of utilizing some embodiments to execute different types of queries on Daytona-based EIS 120 using the architecture illustrated in FIG. 1 and objects based on the class diagram of FIG. 2. It will be understood that, as used herein, the term "query" refers generally to a set of statements issued to EIS 120 to retrieve, insert, delete, and/or modify data stored in EIS 120.

In FIG. 3, the logical flow of executing a query to retrieve data from Daytona-based EIS 120 is illustrated according to some embodiments. The flow starts at block 300, when client component 100 calls the JNDI service provided by application server 105, and retrieves DaytonaConnectionFactory object 205. At block 305, client component 100 obtains DaytonaConnection handle 210 from DaytonaConnectionFactory object 205. As described earlier with respect to FIG. 2, all interaction between client component 100 and EIS 120 is handled via DaytonaConnection handle 210 provided by the DaytonaConnectionFactory object 205.

Client component 100 makes a query request via DaytonaConnection handle 210 at block 310. The query request may include a query composed of statements written, e.g., using Structured Query Language (SQL); using Cymbal, the query language provided by Daytona-based EIS 120; or in a combination of SQL and Cymbal known as Daytona SQL (DSQL). The query request may be accompanied by a custom formatter object, which may specify the particular format in which the query results, if any, are to be returned to the client. At block 315, DaytonaConnection object 210 passes the query request and the custom formatter object, if provided, to DaytonaManagedConnection object 215. As noted above with respect to FIG. 2, DaytonaManagedConnection object 215 maintains the actual connection to EIS 120, and is responsible for handling tasks associated with issuing commands for compiling, executing, retrieving, and parsing the results of queries.

At block 320, DaytonaManagedConnection object 215 initiates the process of running the query by issuing the DS_OPEN command to the PolyClient Daytona Query (PDQ) server of EIS 120. The PDQ server is the component of EIS 120 responsible for receiving, and executing query commands issued by clients. In some embodiments, DaytonaManagedConnection object 215 may be configured to use multiple processor threads, so that any timeouts or other abnormal conditions resulting from commands sent to the PDQ server may be handled by DaytonaManagedConnection object 215 without blocking the normal execution flow of DaytonaManagedConnection object 215. DaytonaManagedConnection object 215 may also send login credentials and an identification of the query type (i.e., whether the query is composed of Cymbal, SQL, or DSQL statements) along with the DS_OPEN command. At block 325, DaytonaManagedConnection object 215 issues the DS_COMPILE command, including a name by which the query may be referred and the text of the query itself, to the PDQ server. At block 330, DaytonaManagedConnection object 215 then sends the DS_EXECUTE command, including the query name, to the PDQ server, which causes the query to be executed on EIS 120.

Next, at block 335, DaytonaManagedConnection object 215 issues the DS_CAT command, including the query name, to the PDQ server, instructing EIS 120 to return the results of the query execution. After the results are received, DaytonaManagedConnection object 215 issues the DS_CLOSE command to the PDQ server to terminate the connection at block 340. DaytonaManagedConnection object 215 thus enforces the proper termination and cleanup of database connections to ensure the maximum utilization of available connections. At decision block 345, DaytonaManagedConnection object 215 determines whether a custom formatter object was specified for the executed query. If not, DaytonaManagedConnection object 215 returns the query results as received from EIS 120 to client component 100 at block 355. If, however, a custom formatter object was specified, DaytonaManagedConnection object 215 formats the query results as specified by the custom formatter object at block 350 before returning the formatted query results to client component 100 at block 355.

FIG. 4 is a flowchart illustrating at a high level the logical flow of executing a precompiled query to retrieve data from Daytona-based EIS 120 according to some embodiments. The flow starts at block 400, when client component 100 calls the JNDI service to retrieve DaytonaConnectionFactory object 205. At block 405, client component 100 obtains DaytonaConnection handle 210 from DaytonaConnectionFactory object 205.

Next, at block 410, client component 100 accesses a list provided by DaytonaConnection handle 210 of precompiled queries available on EIS 120. A precompiled query may be a query that has been previously defined, compiled, and stored on EIS 210, and made available for execution by clients. At block 415, client component 100 selects one of the available precompiled queries, and makes a query request for execution of the precompiled query, optionally accompanied by a custom formatter object, via DaytonaConnection handle 210. At block 420, DaytonaConnection object 210 passes the query request and the custom formatter object, if provided, to DaytonaManagedConnection object 215.

At block 425, DaytonaManagedConnection object 215 issues the DS_OPEN command, including login credentials and an identification of the query type, to the PDQ server of EIS 120. Next, at block 430, DaytonaManagedConnection object 215 sends the DS_EXECUTE command, including the query name and any required query parameters, to the PDQ server, which causes the precompiled query to be executed on EIS 120. Next, at block 435, DaytonaManagedConnection object 215 issues the DS_CAT command, including, the query name, to the PDQ server, instructing, EIS 120 to return the results of the query execution. After the results are received, DaytonaManagedConnection object 215 issues the DS_CLOSE command to the PDQ server to terminate the connection at block 440. At decision block 445, DaytonaManagedConnection object 215 determines whether a custom formatter object was specified for the executed query. If not, DaytonaManagedConnection object 215 returns the query results as received from EIS 120 to client component 100 at block 455. If, however, a custom formatter object was provided, DaytonaManagedConnection 215 object formats the query results as specified by the custom formatter object at block 450 before returning the formatted query results to client component 100 at block 455.

FIG. 5 is a flowchart illustrating at a high level the logical flow of executing an insert query on Daytona-based EIS 120 according, to some embodiments. The flow starts at block 500, when client component 100 calls the JNDI service to retrieve DaytonaConnectionFactory object 205. At block 505, client component 100 obtains DaytonaConnection handle 210 from DaytonaConnectionFactory object 205. Next, at block 510, client component 100 makes an insert query request by passing to DaytonaConnection handle 210 a list of name/value pairs, along with the corresponding record class (which, in Daytona-based EIS 120, is the equivalent of a database table). The list of name/value pairs may be embodied by, for example, an XML document, a hash table, or any other data structure that supports a name/value association. DaytonaConnection handle 210 then passes the insert query request to DaytonaManagedConnection object 215 at block 515.

At block 520, DaytonaManagedConnection object 215 converts the list of name/value pairs and the corresponding record class into valid Cymbal script for inserting data into EIS 120. The script generated by DaytonaManagedConnection 215 may also include the necessary commands to ensure that the insert request occurs within a transaction, so that if an error or other abnormal condition occurs during execution of the insert query, all modifications to the data in the EIS made by the script can be "rolled back" or undone. At block 525. DaytonaManagedConnection object 215 issues the DS_OPEN command, including login credentials and an identification of the query type, to the PDQ server of EIS 120. At block 530, DaytonaManagedConnection object 215 issues the DS_COMPILE command, including a name by which the query may be referred and the script generated by Daytona-ManagedConnection object 215, to the PDQ server. At block 535, DaytonaManagedConnection object 215 sends the DS_EXECUTE command, including the query name, to the PDQ server, which causes the query to be executed on EIS 120.

Next, at block 540, DaytonaManagedConnection object 215 issues the DS_CAT command, including the query name, to the PDQ server, instructing, EIS 120 to return the results of the query execution. If any errors or other abnormal conditions occurred during execution of the query that would require, e.g., the rollback of the transaction, such errors or abnormal conditions are captured by DaytonaManagedConnection object 215 at block 545. After the results of the query are received, DaytonaManagedConnection object 215 issues the DS_CLOSE command to the PDQ server to terminate the connection at block 550, and DaytonaManagedConnection object 215 returns the query results to client component 100 at block 555.

It will be understood by one of skill in the art that, in some embodiments, resource adapter 115 may be further configured to catch exceptions resulting from opening, compiling, executing, receiving, the result of, or terminating a connection to EIS 120. In response to catching an exception, resource adapter 115 may dispatch an error notification by, for instance, raising an error to be caught by client component 100, logging the error in a log file, and/or sending an e-mail notification of the error. It will be further understood that, while FIGS. 3-5 each illustrates the execution of a single query request, in some embodiments, multiple query requests to retrieve, insert, delete, or modify data in EIS 120 may be executed using the same open database connection prior to DaytonaManagedConnection object 215 issuing the DS_CLOSE command to the PDQ server to terminate the connection.

Figure 6:
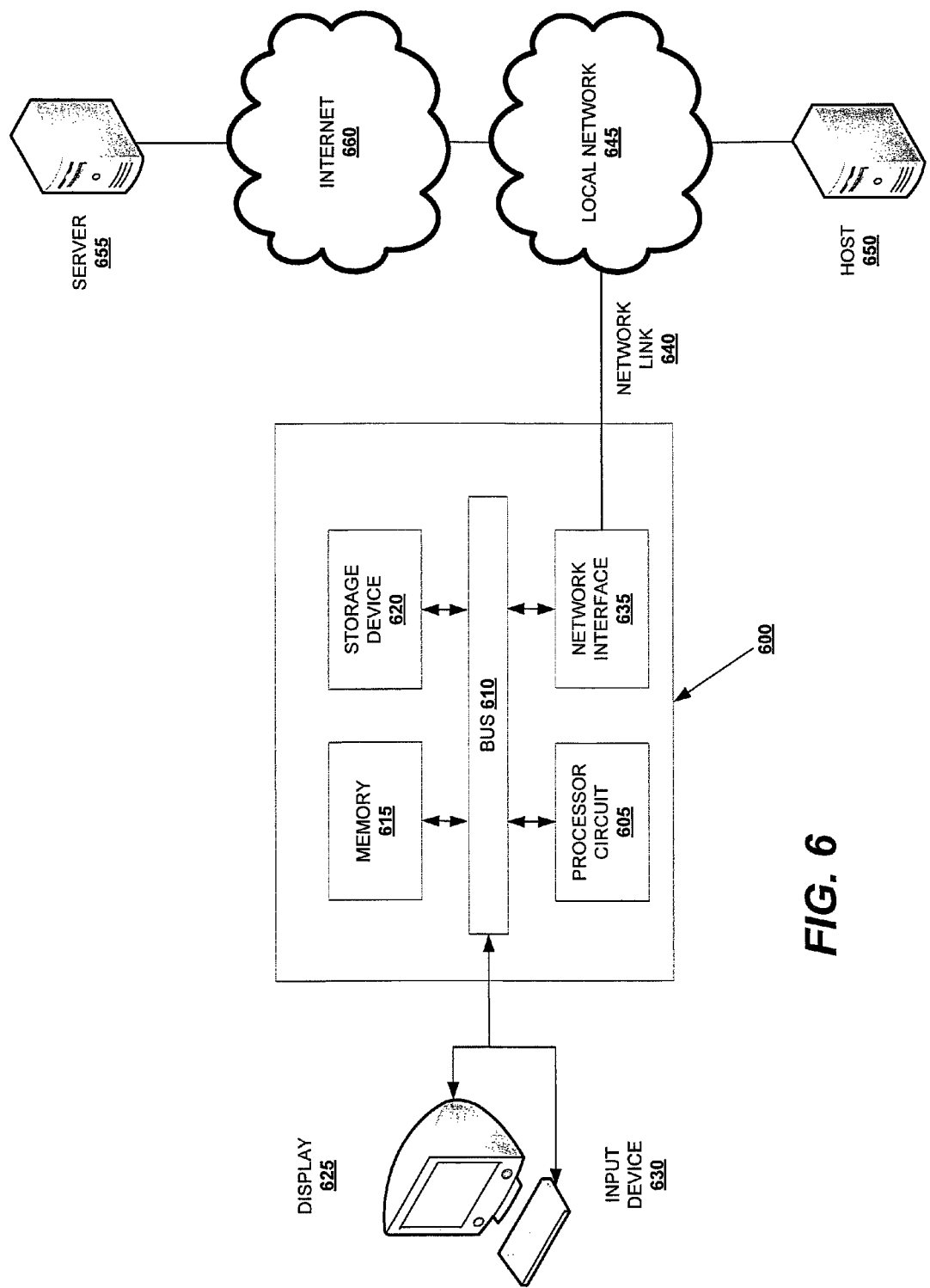
FIG. 6 is a block diagram illustrating a computer system on which some embodiments may be implemented.

FIG. 6 is a block diagram illustrating a computer system 600 on which the methods, systems, and computer program products described herein may be used. Computer system 600 may include a processor circuit 605 for processing commands and information, and which may be communicatively coupled to bus 610. The processor circuit 605 may be embodied, for example, as one or more enterprise, application, personal, pervasive, and/or embedded computer systems and/or special purpose hardware that may be centralized and/or distributed and connected by a wired network and/or a wireless network. Computer system 600 may also include main memory 615 communicatively coupled to bus 610. Main memory 615 may include a random access memory (RAM) or other volatile storage device for storing executing applications or intermediate information during execution of instructions by processor circuit 605, and/or a read-only memory (ROM) or other non-volatile storage device for storing static information and instructions for processor circuit 605. Computer system 600 may further include storage device 620, such as a hard disk drive or other magnetic media device, a compact disc (CD) or digital versatile disc (DVD) drive or other optical media device, or a flash drive or other solid-state device, communicatively coupled to bus 610. Storage device 620 may be used for storing instructions and data for processing by processor circuit 605. Computer system 600 may be communicatively coupled via bus 610 to display 625, such as a liquid-crystal display (LCD) or cathode ray tube (CRT) monitor. Computer system 600 may also be communicatively coupled via bus 610 to input device 630, which may be a device such as a keyboard for entering alphanumeric input, or a mouse, trackball, or touch pad for providing cursor control.

Computer system 600 may also include a network interface 635 communicatively coupled to bus 610. Network interface 635, such as a wired or wireless network interface card (NIC), a modem, or other communications device, may provide a bi-directional data communication coupling via network link 640 to a local network 645. Network link 640 may provide data communication to, e.g. host computer 650 via local network 645, or to server computer 655 via the internet 660. In this way, computer system 600 may send and receive message and data, including program code, through network interface 635 and network link 640.

Some embodiments are related to the use of computer system 600 for implementing the methods, systems, and/or computer program products described herein. According to some embodiments, the methods are performed by computer system 600 in response to processor circuit 605 executing one or more sequences of one or more instructions contained in main memory 615. Such instructions may be read into main memory 615 from another computer-readable medium, such as storage device 620. Execution of the sequences of instructions contained in main memory 615 causes processor circuit 605 to perform the steps described herein. In alternative embodiments, hardware circuitry may be used in place of or in combination with software instructions to implement the embodiments. Thus, the described embodiments are not limited to any specific combination of hardware circuitry and software. Moreover, it will be appreciated by one of skill in the art that embodiments may be implemented on a single computer system 600, or may be implemented on, e.g., a high-availability cluster of two or more computer systems, each substantially similar to computer system 600.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A method for managing and utilizing connections between an application server comprising the Java Platform, Enterprise Edition architecture and an enterprise information system comprising a database management system based on a Daytona architecture, comprising:
  operating a resource adapter, said resource adapter conforming to a Java Platform, Enterprise Edition Connector architecture and being interfaced with and managed by the application server, wherein operating the resource adapter comprises:
    providing a connection to the enterprise information system;
    submitting a query request to the enterprise information system; and
  receiving query results from the enterprise information system;
  wherein submitting a query request to the enterprise information system comprises:
    receiving the query request from a client;
    instructing the enterprise information system to open a query;
    instructing the enterprise information system to compile the query;
    instructing the enterprise information system to execute the query; and
  wherein receiving query results from the enterprise information system comprises:
  instructing the enterprise information system to return the results of the execution of the query;
    receiving the results of the execution of the query from the enterprise information system;
    instructing the enterprise information system to terminate the connection; and
    returning the results of the execution of the query to the client;
    wherein instructing the enterprise information system to open a query comprises issuing a DS OPEN command, including login credentials and a specification of the type of the query, to a PolyClient Daytona Query server of the enterprise information system; and
    wherein instructing the enterprise information system to compile the query comprises issuing a DS COMPILE command, including a name for the query and the query itself, to the PolyClient Daytona Query server; and
  wherein instructing the enterprise information system to execute the query comprises issuing a DS EXECUTE command, including the name for the query, to the PolyClient Daytona Query server; and
    wherein instructing the enterprise information system to return the results of the query comprises issuing a DS CAT command, including the name for the query, to the PolyClient Daytona Query server; and
    wherein instructing the enterprise information system to terminate the connection comprises issuing a DS CLOSE command to the PolgClient Daytona Query server.

2. The method of claim 1, wherein operating the resource adapter further comprises:
submitting a query request to and receive results from the enterprise information system using multiple processing threads.

3. The method of claim 1, wherein the query request comprises a request for execution of a precompiled query in the enterprise information system.

4. The method of claim 3, wherein operating the resource adapter further comprises maintaining a list of precompiled queries available for execution by the client.

5. The method of claim 1, wherein operating the resource adapter further comprises:
catching exceptions associated with the connection; and
dispatching an error notification in response to catching one of the exceptions.

6. The method of claim 1, wherein operating the resource adapter further comprises:
submitting the query request to the enterprise information system within a transaction.

7. The method of claim 1, wherein the query request is a request to insert data, and wherein submitting the query request to the enterprise information system further comprises:
receiving a list of name-value pairs and a corresponding record class from the client;
and converting the list of name-value pairs into the query request.

8. The method of claim 1, wherein submitting a query request to the enterprise information system further comprises:
receiving a formatter object from the client, said formatter object specifying the format in which the results of the execution of the query are to be returned to the client; and
wherein receiving query results from the gig enterprise information system further comprises formatting the results of the execution of the query according to the format specified by the formatter object prior to returning the results of the execution of the query to the client.

9. The method of claim 1, wherein the connection to the enterprise information system comprises a secure connection; and wherein data communicated over the secure connection is encrypted using a cryptographic algorithm.

10. A system for managing and utilizing connections between an application server comprising the Java Platform, Enterprise Edition architecture and an enterprise information system comprising a database management system based on a Daytona architecture comprising:
  a resource adapter, said resource adapter conforming to a Java Platform, Enterprise Edition Connector architecture and being interfaced with and managed by the application server, said resource adapter comprising: a processor; and
  a memory comprising computer readable program code that when executed by the processor causes the processor to perform operations comprising:
  providing a connection to the enterprise information system;
  submitting a query request to the enterprise information system; and receiving query results from the enterprise information system;
wherein submitting a query request to the enterprise information system comprises:
receiving the query request from a client; instructing the enterprise information system to open a query; instructing the enterprise information system to compile the query;
instructing the enterprise information system to execute the query; and wherein
  receiving query results from the enterprise information system comprises:
instructing the enterprise information system to return the results of the execution of the query;
  receiving the results of the execution of the query from the enterprise information system;

instructing the enterprise information system to terminate the connection; and returning the results of the execution of the query to the client;
wherein instructing the enterprise information system to open a query comprises issuing a DS OPEN command, including login credentials and a specification of the type of the query, to a PolyClient Daytona Query server of the enterprise information system; and
wherein instructing the enterprise information system to compile the query comprises issuing a DS COMPILE command, including a name for the query and the query itself, to the PolyClient Daytona Query server; and
wherein instructing the enterprise information system to execute the query comprises issuing a DS EXECUTE command, including the name for the query, to the PolyClient Daytona Query server; and
   wherein instruction the enterprise information system to return the results of the query comprises issuing a DS CAT command, including the name for the query, to the PolyClient Daytona Query server; and
   wherein instructing the enterprise information system to terminate the connection comprises issuing a DS CLOSE command to the PolyClient Daytona Query server.

11. The system of claim 10, wherein the operations further comprise:
submitting a query request to the enterprise information system; and
receiving results from the enterprise information system using multiple processing threads.

12. The system of claim 10, wherein the operations further comprise:
catching exceptions associated with the connection; and
   dispatching an error notification in response to catching one of the exceptions.

13. The system of claim 10, wherein the query request is a request to insert data, and wherein submitting the query request to the enterprise information system further comprises:
receiving a list of name-value pairs and a corresponding record class from the client;
and converting the list of name-value pairs into the query request.

14. A computer program product for managing and utilizing connections between an application server comprising the Java Platform, Enterprise Edition architecture and an enterprise information system comprising a database management system based on a Daytona architecture, comprising:
   a non-transitory tangible computer readable medium comprising computer readable program code that when executed by a processor causes the processor to perform operations comprising:
   operating a resource adapter, said resource adapter conforming to a Java Platform, Enterprise Edition Connector architecture and being interfaced with and managed by the application server, wherein operating the resource adapter comprises: providing a connection to the enterprise information system; submitting a query request to the enterprise information system; and receiving query results from the enterprise information system;
wherein submitting a query request to the enterprise information system comprises:
receiving the query request from a client; instructing the enterprise information system to open a query; instructing the enterprise information system to compile the query;
instructing the enterprise information system to execute the query; and wherein receiving query results from the enterprise information system comprises:
instructing the enterprise information system to return the results of the execution of the query;
receiving the results of the execution of the query from the enterprise information system;
instructing the enterprise information system to terminate the connection; and returning the results of the execution of the query to the client;
wherein instructing the enterprise information system to open a query comprises issuing a DS OPEN command, including login credentials and a specification of the type of the query, to a PolyClient Daytona Query server of the enterprise information system; and
   wherein instructing the enterprise information system to compile the query comprises issuing a DS COMPILE command, including a name for the query and the query itself, to the PolyClient Daytona Query server; and
   wherein instructing the enterprise information system to execute the query comprises issuing a DS EXECUTE command, including the name for the query, to the PolyClient Daytona Query server; and wherein instructing the enterprise information system to return the results of the query comprises issuing a DS CAT command, including the name for the query, to the PolyClient Daytona Query server; and
   wherein instructing the enterprise information system to terminate the connection comprises issuing a DS CLOSE command to the PolyClient Daytona Query server.

15. The computer program product of claim 14, wherein the operations further comprise:
submitting a query request to the enterprise information system; and
receiving results from the enterprise information system using multiple processing threads.

16. The computer program product of claim 14, wherein the computer readable program code that is configured to provide a resource adapter is further configured to operations further comprise:
catching exceptions associated with the connection; and
dispatching an error notification in response to catching one of the exceptions.

17. The computer program product of claim 14, wherein the query request is a request to insert data, and wherein submitting the query request to the enterprise information system further comprises:
receiving a list of name-value pairs and a corresponding record class from the client; and
converting the list of name-value pairs into the query request.

\* \* \* \* \*